Aug. 10, 1943.    H. T. KRAFT    2,326,300
PRELOADER FOR FLUID OPERATED DEVICES
Filed Aug. 6, 1942
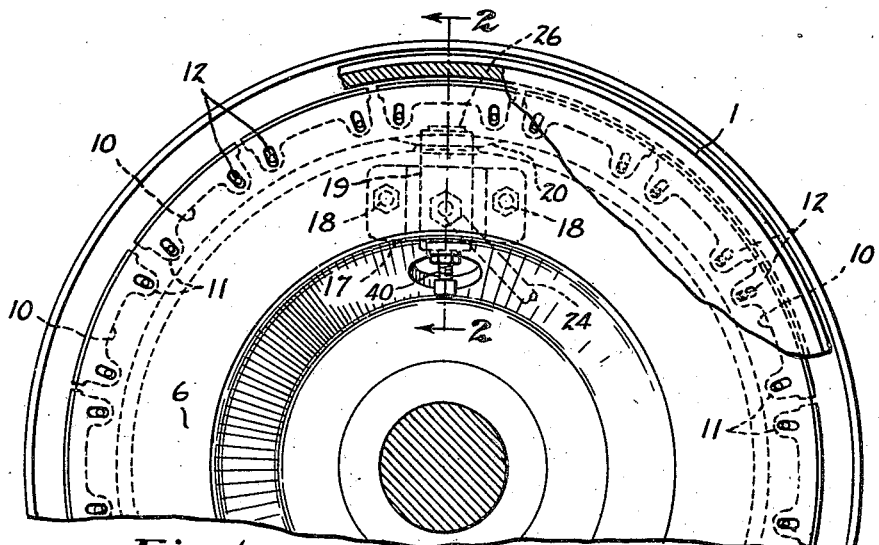
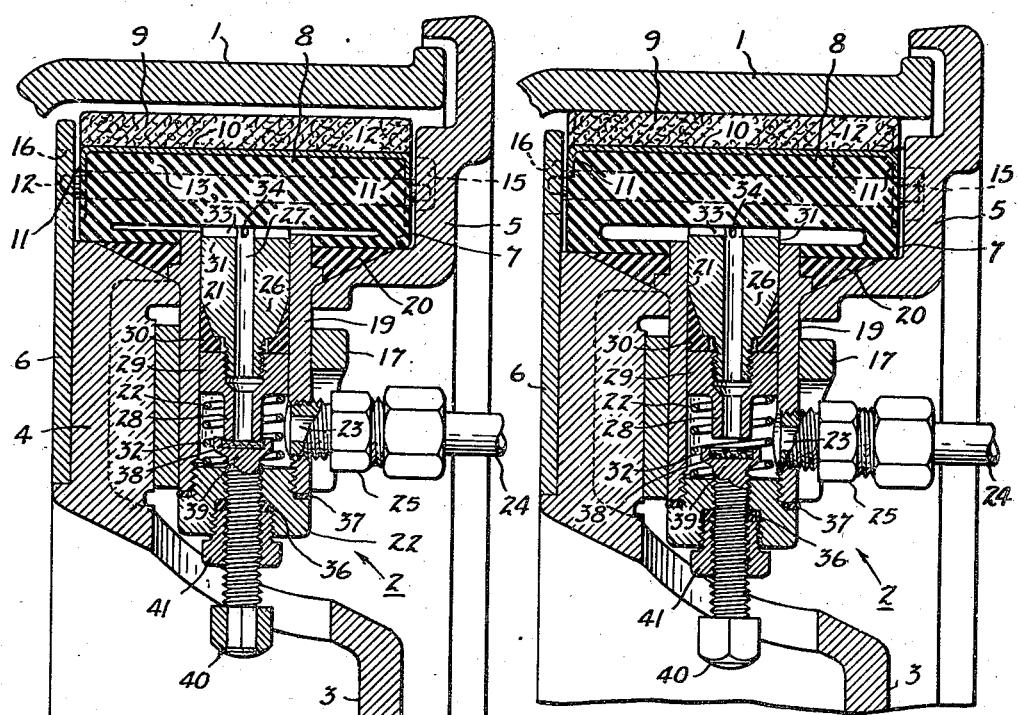
INVENTOR
*Herman T. Kraft*
BY *Evans + McCoy*
ATTORNEYS Patented Aug. 10, 1943

2,326,300

UNITED STATES PATENT OFFICE 2,326,300

PRELOADER FOR FLUID OPERATED DEVICES

Herman T. Kraft, Akron, Ohio, assignor to The General Tire & Rubber Company, Akron, Ohio, a corporation of Ohio Application August 6, 1942, Serial No. 453,803

5 Claims. (Cl. 60—54.6)

This invention relates to preloaders for mechanical devices having an inflatable annulus, or a similarly functioning expansion tube or member, forming a part thereof, as used in brakes, clutches, couplings, and the like, of the fluid pressure operated type.

The present invention has among its objects the provision of a new and improved fluid system preloader that is positioned at the annulus or expansion member which the preloader maintains charged with a predetermined quantity of fluid so that the brake, for example, is actuated by the transfer of a minimum quantity of fluid between the conducting lines of the system and the brake operating mechanism. The small quantity of fluid transferred by the preloader permits the brake or similar mechanism to become engaged and disengaged with a maximum degree of rapidity, effectualness, power, and control, and permits the use of smaller sized master cylinders that produce higher pressures for the same pedal operation than similar devices that have been used heretofore. Combined with each preloader is a wear or fit compensating adjustment that is adapted for the accurate and positive adjustment of the friction shoes of the device. The preloader is positive and self-operating in a pressure fluid system. It is compact and simply installed. The preloader is of small size and light weight and consists of parts that are simply designed, rugged in construction, and dependable in operation.

With the above and other objects in view that will be apparent to those skilled in the art, from the following discussion, the embodiment of the present invention is shown as applied to a vehicle brake, and is illustrated in the accompanying drawing, wherein:

Figure 1 is a fragmentary side elevation, with parts broken away, of a preloader that embodies the present invention as applied to a vehicle brake and showing in section portions of the preloader, the expansible annulus, and the brake drum;

Fig. 2 is a fragmentary axial section of the brake preloader, taken along the line 2—2 of Fig. 1, showing the expansion tube in its preloaded condition; and Fig. 3 is a similar fragmentary axial section of the device showing it in the brake applying position.

The braking assembly comprises a brake drum 1 that is carried by a vehicle wheel (not shown) and the brake actuating assembly 2 that is carried by the torque plate 3 of the vehicle. The brake actuating assembly 2 comprises the body portion 4 that has an inner side flange 5, a removable outer side ring 6, and a seat portion 7 that together define an annular flat bottomed groove for receiving an inflatable annulus 8 of rubber or the like.

Brake blocks 9 are carried by sheet metal saddle members 10, the legs 11 of which straddle the inflatable annulus 8 and are held in place by torque pins 12 that extend through the outer wall 13 of the annulus and through suitable apertures in the legs 11 of the saddle members 10. The ends of the torque pins 12 extend into suitable radial slots 15 and 16 that are formed respectively in the inner side flanges 5 and the outer side ring 6 to carry the braking torque directly from the brake block through the saddle to the torque disc or plate 3.

The preloading device comprises a metal body member 19 that is secured to the inflatable annulus 8 by a rubber pad 20. The metal body member 19 has a cylindrical bore 21, one end of which opens into the cavity of the annulus 8 and the opposite end of which has a fluid inlet port 23 but is otherwise closed in any desired manner, as by the plug 22. Braking fluid flows through the fluid inlet port 23 toward or away from the device through the supply tube 24 that is attached to the body member 19 of the preloader in any suitable manner, as by the fitting 25 or the like.

A cylindrical piston member 26 is mounted for reciprocating motion within the cylindrical bore 21 of the body member 19. The piston 26 has a channel 27 extending therethrough for conducting braking fluid into and out of the inflatable annulus 8. The piston 26 terminates at one end in a valve 28 through which the fluid channel 27 opens. The valve 28 may be a part of a single piece piston or it may be formed as a part of a removable packing ring 29 that makes threaded engagement with the body portion of the piston 26 as shown to compress packing 30 between the pitson body and the bore of the body member 19. For certain uses, such as on aircraft brakes, for instance, the packing member may be dispensed with because one operation of the brake will preload the system even when there is substantial leakage past the piston body. The other end of the piston 26 terminates in a head portion 31 that is engaged by the radially outer wall 13 of the annulus 8 that yieldingly presses the piston member 26 toward the cylindrical bore 21 of the body member 19 and against the resilience of the helical compression spring 32. The spring 32 is supported at its lower end by the plug 22. Suitable means, such as crossed channels 33 and 34 in the head of the piston 26, permit unrestricted flow of the pressure fluid between the cavity of the annulus 8 and the piston fluid channel 27 that terminates in the valve 28.

Suitable means, such as an adjusting bolt 40, that threads through the plug 22, serves to adjustably position the valve seat 38 with respect to the valve 28 part of the piston 26. The valve seat 38 is mounted in a valve seat cup 39 on the end of the bolt 40. By means of this arrangement, the valve seat 38 may be adjusted toward or away from the valve 28 to compensate for wear or for adjustment of the brake shoes 9 relative to the brake drum 1. The valve seat 38 is secured in its adjusted position by a locking nut 41 that threads into the plug 22. The adjusting bolt 40 is sealed against leakage by means of the packing 36 that is interposed between the locking nut 41 and the plug 22. A gasket 37 is interposed between the plug 22 and the body member 19 for the same reason.

In the position shown in Fig. 2 of the accompanying drawing, the radially outer wall 13 of the inflatable annulus 8, yieldingly bears against the head 31 of the piston 26 to maintain the valve 28 closed against the valve seat 38. When the piston 26 is in this position, the braking fluid within the annulus cavity and the piston fluid channel 27 is entrapped therein and the brake shoes 9 are held just out of engagement with the brake drum 1.

When the supply tube 24 conducts high pressure braking fluid from the braking system into the valve compartment of the preloader, the hydrostatic head forces the piston 26 outwardly of the bore 21 of the body member 19, and forces the valve 28 out of engagement with the valve seat 38 as shown in Fig. 3 of the accompanying drawing. The system is then open for the dilation of the annulus 8 and the application of the brake shoes 9 against the brake drum 1 with a degree of force that is proportional to the pressure to which the braking fluid is subjected.

Upon the release of pressure in the supply tube 24, the excess braking fluid in the annulus 8 passes through the crossed channels 33 and 34 in the head 31 of the piston 26, through the fluid conducting channel 27 in the piston 26, out of the mouth of the valve 28, and into the tube 24, until the pressure of the outer wall 13 of the annulus 8 on the head 31 of the piston 26 seats the valve 28 on its valve seat 38 to entrap the residual braking fluid in the annulus cavity ahead of the valve 28 and thus maintain the annulus 8 sufficiently full of the braking fluid to hold the brake shoes 9 in a position that assures a minimum clearance between the brake shoes 9 and the brake drum 1.

When the frictional surfaces of the brake shoes wear away or get out of adjustment, the lock nut 41 may be loosened, and the valve seat adjusting bolt 40 rotated in the plug 22 to elevate the valve seat 38 and thereby maintain the desired clearance between the brake shoes and the drum. The locking nut 41 is then tightened to maintain the valve seat 38 in the desired position with respect to the valve 28.

It will be obvious to those skilled in the art that preloaders of the kind described and claimed herein may be used with internally and externally expanded fluid controlled clutches and releasable couplings for machine parts and for other applications where preloading of an expansion member is desired.

It is to be understood that the particular constructions shown, the particular assembly of parts, and the mode of operation and the results of the embodiment of the invention that are herein presented, are set forth for the purposes of illustration and explanation of the invention, and that modifications therein may be made without departing from the invention as defined by the appended claims.

What I claim is:

1. A preloader for an inflatable member having oppositely positioned walls that are separated by the inflation thereof comprising in combination, a body member carried by one of said oppositely positioned walls and having a cylindrical bore opening into the inflatable member at one end and closed at the other end except for a fluid inlet port, a cylindrical piston member reciprocable within said bore and having a fluid channel extending from end to end thereof, one end of said piston member terminating in a valve into which said fluid channel opens and the other end of said piston member having parts for engagement with the other of said oppositely positioned walls, a valve seat carried by the body member and arranged for engagement with the valve of said piston member to open and close said fluid channel, and means for adjusting said valve seat toward and away from said inflatable member.

2. A preloader for an inflatable member having oppositely positioned walls that are separated by the inflation thereof comprising in combination, a body member carried by one of said oppositely positioned walls and having a cylindrical bore opening into the inflatable member at one end and closed at the other end except for a fluid inlet port, a cylindrical piston member reciprocable within said bore and having a fluid channel extending from end to end thereof, one end of said piston member terminating in a valve into which said fluid channel opens and the other end of said piston member having parts for engagement with the other of said oppositely positioned walls, a valve seat carried by the body member and arranged for engagement with the valve of said piston member to open and close said fluid channel, means for adjusting said valve seat toward and away from said inflatable member, and spring means interposed between said piston and the closed end of said body member to urge said piston member toward the other of said oppositely positioned walls of the inflatable member.

3. A preloader for an inflatable member having oppositely positioned walls that are separated by the inflation thereof comprising in combination, a body member carried by one of said oppositely positioned walls and having a cylindrical bore opening into the inflatable member at one end and closed at the other end except for a fluid inlet port, a cylindrical piston member reciprocable within said bore and having a fluid channel extending from end to end thereof, one end of said piston member terminating in a valve into which said fluid channel opens and the other end of said piston member having parts for engagement with the other of said oppositely positioned walls, packing means interposed between said piston member and said cylindrical bore for minimizing the leakage of fluid therebetween, a valve seat carried by the body member and arranged for engagement with the valve of said piston member to open and close said fluid channel, and means for adjusting said valve seat toward and away from said inflatable member.

4. A preloader for an inflatable member having oppositely positioned walls that are separated by the inflation thereof comprising in combination, a body member carried by one of said oppositely positioned walls and having a cylindrical bore opening into the inflatable member at one end and closed at the other end except for a fluid inlet port, a cylindrical piston member reciprocable within said bore and having a fluid channel extending from end to end thereof, one end of said piston member terminating in a valve into which said fluid channel opens and the other end of said piston member having parts for engagement with the other of said oppositely positioned walls, a packing interposed between said piston member and the cylindrical bore in said body member for maintaining a substantially fluid-tight relation therebetween, a packing ring engaging said piston for exerting pressure on said packing, a valve seat carried by the body member and arranged for engagement with the valve of said piston member to open and close said fluid channel, and means for adjusting said valve seat toward and away from said inflatable member.

5. A preloader for an inflatable member having oppositely positioned walls that are separated by the inflation thereof comprising in combination, a body member carried by one of said oppositely positioned walls and having a cylindrical bore opening into the inflatable member at one end and closed at the other end except for a fluid inlet port, a cylindrical piston member reciprocable within said bore and having a fluid channel extending from end to end thereof, one end of said piston member terminating in a valve into which said fluid channel opens and the other end of said piston member having parts for engagement with the other of said oppositely positioned walls, a packing interposed between said piston member and the cylindrical bore in said body member for maintaining a substantially fluid-tight relation therebetween, a packing ring engaging said piston for exerting pressure on said packing, a valve seat carried by the body member and arranged for engagement with the valve of said piston member to open and close said fluid channel, means for adjusting said valve seat toward and away from said inflatable member, and spring means interposed between said piston and the closed end of said body member to urge said piston member toward the other of said oppositely positioned walls of the inflatable member.

HERMAN T. KRAFT.